United States Patent
Irwan et al.

(10) Patent No.: US 10,144,404 B2
(45) Date of Patent: Dec. 4, 2018

(54) VEHICLE HAVING BRAKE SYSTEM AND METHOD OF OPERATING

(71) Applicant: Robert Bosch GmbH, Stuttgart (DE)

(72) Inventors: Rosalin Irwan, Ann Arbor, MI (US); Quingyuan Li, Superior Township, MI (US); Wenguang Zhou, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 168 days.

(21) Appl. No.: 15/373,409

(22) Filed: Dec. 8, 2016

(65) Prior Publication Data
US 2018/0162338 A1  Jun. 14, 2018

(51) Int. Cl.
| | |
|---|---|
| *B60T 17/22* | (2006.01) |
| *B60T 13/74* | (2006.01) |
| *B60T 8/40* | (2006.01) |
| *B60T 8/171* | (2006.01) |
| *B60T 7/04* | (2006.01) |
| B60T 11/16 | (2006.01) |
| B60T 13/66 | (2006.01) |
| B60T 13/68 | (2006.01) |

(52) U.S. Cl.
CPC ............ *B60T 17/221* (2013.01); *B60T 7/042* (2013.01); *B60T 8/171* (2013.01); *B60T 8/4081* (2013.01); *B60T 13/745* (2013.01); B60T 11/16 (2013.01); B60T 13/662 (2013.01); B60T 13/686 (2013.01); B60T 2270/404 (2013.01); B60T 2270/406 (2013.01); B60T 2270/408 (2013.01); B60T 2270/82 (2013.01); B60T 2270/88 (2013.01)

(58) Field of Classification Search
CPC ................. B60T 17/221; B60T 13/745; B60T 2270/404; B60T 2270/82; B60T 8/171; B60T 8/4081
See application file for complete search history.

(56) References Cited

U.S. PATENT DOCUMENTS

| | | |
|---|---|---|
| 3,587,352 A | 6/1971 | Ougi |
| 4,827,416 A | 5/1989 | Kawagoe et al. |
| | (Continued) | |

FOREIGN PATENT DOCUMENTS

| | | |
|---|---|---|
| CN | 2165048 Y | 5/1994 |
| DE | 19500545 A1 | 7/1996 |
| | (Continued) | |

*Primary Examiner* — Vishal R Sahni
(74) *Attorney, Agent, or Firm* — Michael Best & Friedrich LLP

(57) ABSTRACT

A vehicle includes a brake pedal, a master cylinder, a braking circuit with a wheel cylinder, and a brake pressure generator with strokable piston. A pedal feel simulator is coupled to the master cylinder through a switchable valve, the simulator providing a reaction force. An isolation valve closes to isolate the braking circuit from the master cylinder and the simulator circuit. A controller is programmed to connect the simulator circuit with an outlet of the brake pressure generator, and to stroke and retract the piston at a designated diagnostic time. The controller observes a pressure decrease as the piston retracts and checks whether the pressure-decrease to piston-retraction relationship is within a predetermined acceptable range for continued operation of a brake-by-wire mode in which the master cylinder is coupled to the simulator circuit and decoupled from the braking circuit.

20 Claims, 3 Drawing Sheets

(56) References Cited

U.S. PATENT DOCUMENTS

| | | | |
|---|---|---|---|
| 6,129,425 A | 10/2000 | Onuma | |
| 6,149,247 A * | 11/2000 | Hofmann | B60T 8/3655 |
| | | | 303/113.2 |
| 6,398,319 B1 | 6/2002 | Wilson et al. | |
| 6,604,795 B2 | 8/2003 | Isono et al. | |
| 7,344,206 B2 * | 3/2008 | Schmidt | B60T 8/34 |
| | | | 188/352 |
| 9,145,121 B2 | 9/2015 | Jungbecker et al. | |
| 9,221,444 B2 | 12/2015 | Lim | |
| 2001/0022254 A1 * | 9/2001 | Hofmann | B60T 7/042 |
| | | | 188/40 |
| 2013/0218407 A1 * | 8/2013 | Jungbecker | B60T 7/042 |
| | | | 701/34.4 |
| 2014/0203626 A1 * | 7/2014 | Biller | B60T 8/4081 |
| | | | 303/10 |
| 2014/0210253 A1 | 7/2014 | Okana et al. | |
| 2014/0346852 A1 * | 11/2014 | Thrasher | B60T 8/4081 |
| | | | 303/10 |
| 2015/0001917 A1 | 1/2015 | Murayama et al. | |
| 2015/0224972 A1 * | 8/2015 | Feigel | B60T 8/4081 |
| | | | 303/15 |
| 2016/0082937 A1 | 3/2016 | Nakaoka et al. | |
| 2018/0162341 A1 * | 6/2018 | Irwan | B60T 17/221 |

FOREIGN PATENT DOCUMENTS

| | | |
|---|---|---|
| DE | 102011081240 A1 | 4/2012 |
| DE | 102010050132 A1 | 5/2012 |
| DE | 102012201535 A1 | 10/2012 |
| KR | 20010113214 A | 12/2001 |
| KR | 100765600 B1 | 2/2007 |

* cited by examiner

VEHICLE HAVING BRAKE SYSTEM AND METHOD OF OPERATING

BACKGROUND

The present invention relates to vehicles having brake systems. It is known to provide a vehicle with a full-power brake system (also referred to as a "decoupled" or "brake-by-wire" system) in which driver applied force does not propagate to produce the actual braking force to the brake devices. Instead, fluid is pushed from the master cylinder into a simulator circuit while another mechanism provides the actual braking force. Although satisfactory for the intended purpose, a great number of valves and sensors must all be in working order to provide brake-by-wire operation, and it can be difficult to diagnose faults within the system.

SUMMARY

In one aspect, the invention provides a vehicle including a master cylinder having an input side configured to receive an input from a brake pedal and an output side configured to provide a master cylinder output. At least one braking circuit of the vehicle has at least one wheel cylinder and a brake pressure generator, including a strokable piston, separate from the brake pedal. A simulator circuit includes a pedal feel simulator coupled to the master cylinder output side through a switchable simulator valve, the pedal feel simulator providing a reaction force to the brake pedal when the switchable simulator valve is in an open position. At least one normally-open isolation valve is operable to close and isolate the at least one braking circuit from the master cylinder and the simulator circuit. A pressure sensor is operable in at least one vehicle configuration to be in fluid communication with both the simulator circuit and the brake pressure generator. A controller is programmed to, at a designated diagnostic time when no input is received from the brake pedal, establish a diagnostic circuit connecting the simulator circuit with an outlet of the brake pressure generator, and to stroke the piston in an advancing, pressure-generating direction and then retract the piston while observing a resulting brake fluid pressure decrease with the pressure sensor during piston retraction. The controller is further programmed to check whether the relationship between the observed brake fluid pressure decrease and the piston retraction is within a predetermined acceptable range for continued operation of a brake-by-wire vehicle braking mode in which the master cylinder is coupled to the simulator circuit and decoupled from the at least one braking circuit, while brake fluid pressure is generated solely by the brake pressure generator.

In another aspect, the invention provides a method of operating a vehicle utilizing a controller. The vehicle is operated in a primary brake-by-wire braking mode including: A) receiving an input from a brake pedal at an input side of a master cylinder and providing a master cylinder output corresponding to the brake pedal input at an output side of the master cylinder output, B) closing, by a controller signal, at least one normally-open isolation valve to isolate the output side of the master cylinder from at least one braking circuit having at least one wheel cylinder, C) sending a controller signal to a switchable simulator valve to open a fluid connection between the master cylinder output side and a simulator circuit including a pedal feel simulator to provide a reaction force to the brake pedal, D) sending a braking request signal to the controller corresponding to the input from the brake pedal, and E) driving a brake pressure generator of the at least one braking circuit with the controller responsive to the braking request signal to achieve braking at the at least one wheel cylinder, the brake pressure generator having a strokable piston separate from the brake pedal. A controller signal is sent, at a designated diagnostic time when no input is received from the brake pedal, to establish a diagnostic circuit connecting the simulator circuit with an outlet of the brake pressure generator. At the designated diagnostic time, stroking the piston in an advancing, pressure-generating direction and then retracting the piston while observing a resulting brake fluid pressure decrease during piston retraction. The controller determines whether the relationship between the observed brake fluid pressure increase and the piston retraction is within a predetermined acceptable range for continued operation of the primary brake-by-wire braking mode.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
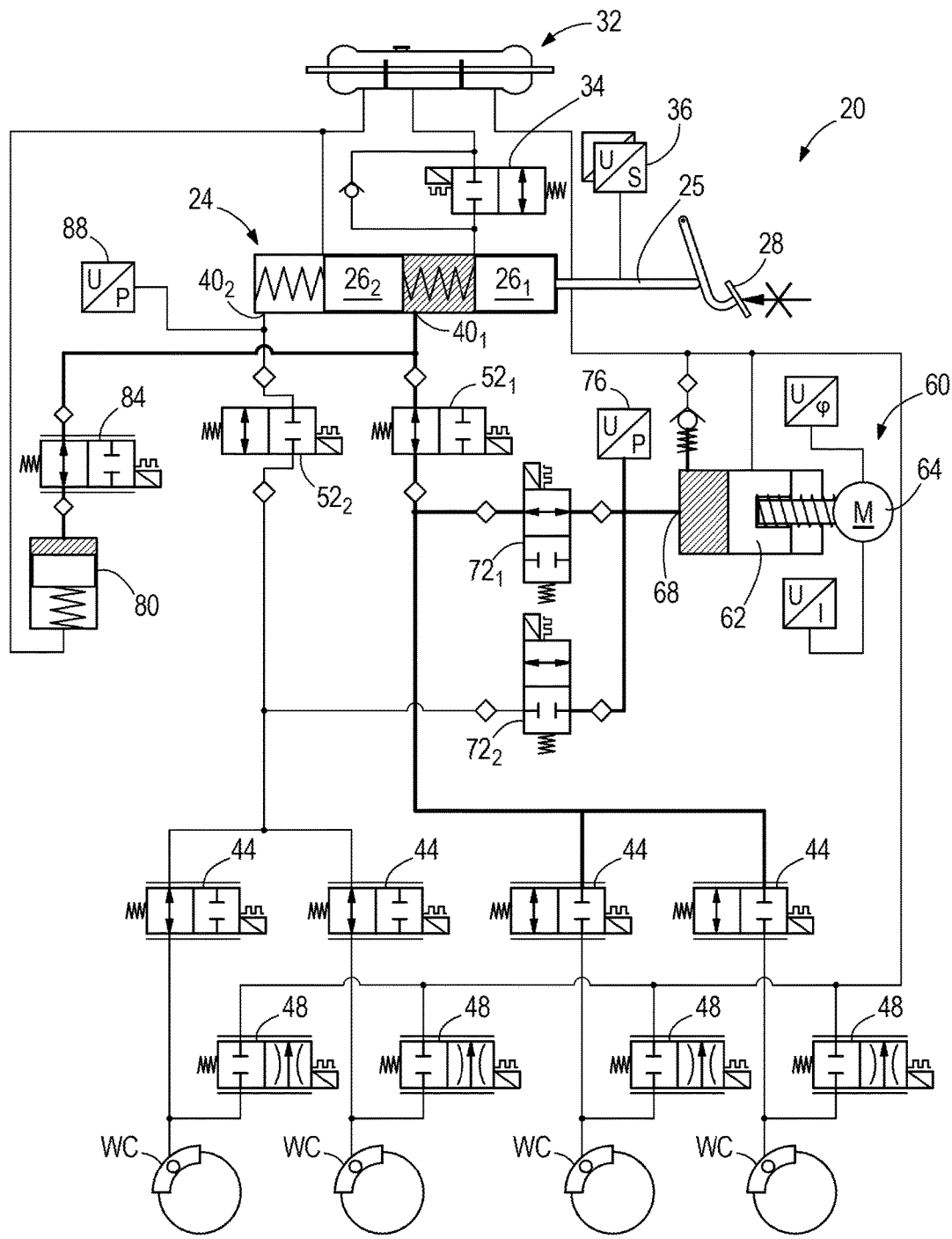
FIG. 1 is a schematic drawing of a vehicle braking system according to one aspect of the present invention. A diagnostic system configuration during non-braking is illustrated.

The braking system 20 of FIG. 1 includes a master cylinder 24 having an input side coupled with an input rod 25 to a brake pedal 28 to pressurize hydraulic fluid therein. The master cylinder 24 includes a first piston $26_1$ that is coupled to the brake pedal 28 to move directly therewith. The first piston $26_1$ pressurizes hydraulic fluid in a first chamber of the master cylinder 24 to be output from the first chamber at a first outlet $40_1$. A second piston $26_2$ of the master cylinder 24 can be moved under the influence of fluid pressurized in the first chamber by the first piston $26_1$, without the second piston $26_2$ having any direct connection to the first piston $26_1$ or the brake pedal 28. The second piston $26_1$ pressurizes hydraulic fluid in a second chamber of the master cylinder 24 to be output from the second chamber at a second outlet $40_2$. A fluid reservoir 32 is in fluid communication with the first and second chambers of the master cylinder 24 until the brake pedal 28 is initially actuated, at which time the pistons $26_1$, $26_2$ block off the master cylinder chambers from the reservoir 32. A normally-open solenoid valve 34 can selectively establish a connection between the reservoir 32 and the first master cylinder chamber. A pedal travel sensor 36 is coupled to the brake pedal 28 and is operable to detect an amount of travel of the brake pedal 28, so that a corresponding signal can be sent to a controller (not shown). The controller can be a computer electrically coupled with each sensor and each electrically-operable valve of the braking system 20, to send signals thereto and/or receive signals therefrom to establish communication and control necessary to operate the braking system 20.

The dual outputs $40_1$, $40_2$ of the master cylinder 24 are selectively in fluid communication with a first braking circuit and a second braking circuit, respectively. In the illustrated construction, each of the braking circuits includes a pair of brake devices or wheel cylinders WC operable to slow down the wheels of a vehicle on which the braking system 20 is provided. The wheel cylinders WC of a particular circuit can be associated with a set of front vehicle wheels, a set of rear vehicle wheels, or a set of diagonal vehicle wheels. Each braking circuit includes an inlet valve 44 and an outlet valve 48 associated with each respective wheel cylinder WC. The inlet valves 44 are normally-open and can be electrically closed by the controller to stop or limit pressurized hydraulic fluid supplied to the wheel cylinder WC. The outlet valves 48 are normally-closed and can be electrically opened by the controller to relieve pressurized hydraulic fluid at the wheel cylinder WC, to the reservoir 32. Each of the master cylinder outlets $40_1$, $40_2$ is coupled to one of the braking circuits through a normally-open isolation valve $52_1$, $52_2$. Each of the isolation valves $52_1$, $52_2$ is operable to be closed by the controller to fluidly separate or isolate the master cylinder 24, and thus the brake pedal 28, from the braking circuits having the wheel cylinders WC.

Although the master cylinder 24 is capable of providing mechanical braking from the brake pedal 28 to the wheel cylinders WC of the two braking circuits, the system 20 can be provided with an alternate or auxiliary device, separate from the brake pedal 28 and referred to herein as a brake pressure generator 60, for generating hydraulic fluid pressure to the wheel cylinders WC for the requisite braking need. The brake pressure generator 60 can include a plunger or piston 62 drivable in a cylinder by an actuator such as an electric motor 64 operated by the controller. As such, the brake pressure generator 60 is operable to drive pressurized hydraulic fluid to the wheel cylinders WC of the first and second braking circuits. For example, an outlet 68 of the brake pressure generator 60 can be coupled, in parallel, to the first and second braking circuits through respective apply pressure control valves $72_1$, $72_2$. Each of the apply pressure control valves $72_1$, $72_2$ can be a controller-modulated solenoid valve (e.g., having a range of open positions, or receiving a pulse-width modulation signal to achieve a similar effect) operable to control the pressure supplied from the brake pressure generator 60 to the wheel cylinders WC of the given braking circuit. The apply pressure control valves $72_1$, $72_2$ can be coupled to respective brake fluid supply lines or passages, each of which extends between one of the isolation valves $52_1$, $52_2$ and the respective inlet valves 44 of the braking circuit. One or more pressure sensors 76 can be positioned along the fluid path between the brake pressure generator outlet 68 and the respective inlet valves 44 and operable to report the fluid pressure to the controller. The pressure sensor 76 can be referred to as an "active circuit" pressure sensor as it senses and reports the fluid pressure in the passage(s) coupled to the wheel cylinders WC, as contrasted with fluid pressure in the master cylinder 24 or a simulator circuit, which are not part of an active braking circuit during brake-by-wire operation. Additional sensors may be provided to monitor parameters of the piston 62 and/or the electric motor 64, and may include any one or more of: linear or angular position, electrical current, electrical voltage, force, torque, or temperature.

In addition to the active braking components in the system 20, a simulator circuit is provided in fluid communication with the output side of the master cylinder 24. The simulator circuit is provided upstream of the isolation valves $52_1$, $52_2$, meaning the side nearer the master cylinder and remote from the braking circuits so that the simulator circuit is kept in fluid communication with the master cylinder 24 when the isolation valves $52_1$, $52_2$ are closed. The simulator circuit includes a pedal feel simulator 80 coupled to an outlet of the master cylinder 24 (e.g., the first outlet $40_1$) through a switchable simulator valve 84. The simulator valve 84 can be a normally-closed switchable solenoid valve operable to be opened by the controller to establish fluid communication between the master cylinder outlet $40_1$ and the pedal feel simulator 80. When the simulator valve 84 is open, fluid pushed out of the master cylinder chamber through the outlet $40_1$ is passed into the pedal feel simulator 80, which has a biasing mechanism that provides a feedback force to the brake pedal 28. Thus, the simulator circuit mimics the feel of actuating the wheel cylinders WC when in fact the brake pedal 28 is decoupled by the isolation valves $52_1$, $52_2$ from the actual braking pressure activating the wheel cylinders WC in the braking circuits. A pressure sensor, referred to herein as the primary pressure sensor 88, is provided in fluid communication with the master cylinder 24 to detect a fluid pressure generated in one of the master cylinder chambers. For example, the primary pressure sensor 88 can be coupled to the second master cylinder outlet $40_2$, upstream of the isolation valve $52_2$. The primary pressure sensor 88 is operable to generate a braking request signal responsive to an input force from the brake pedal 28.

Though not conducive to labeling in FIG. 1, it will be understood that each braking circuit extends from one of the isolation valves $52_1$, $52_2$ to the respective wheel cylinder(s) WC, and further includes the passages connecting to the brake pressure generator 60, and the respective passages connecting to the fluid reservoir 32, while the simulator circuit is a separate circuit, not part of either of the braking circuits, since fluid in the simulator circuit is not conveyed to contribute to actual braking force at the wheel cylinders WC.

During normal operation of the braking system 20, the brake pedal 28 is decoupled from the wheel cylinders WC so that braking occurs fully in a primary brake-by-wire mode. When the driver depresses the brake pedal 28, the isolation valves $52_1$, $52_2$ are actuated to a closed position (opposite the position shown in FIG. 1) so that the master cylinder 24 and the simulator circuit are cut-off or isolated from the braking circuits. The simulator valve 84 is also switched open by the controller upon initial actuation of the brake pedal 28, which can be detected by the pedal travel sensor 36. A pressure increase occurs in the second master cylinder chamber and between the second outlet $40_2$ and the second isolation valve $52_2$ since the pedal 28 urges the pistons $26_1$, $26_2$ to move toward the closed-off second isolation valve $52_2$. The pressure increase is measured or detected by the primary pressure sensor 88 and conveyed as a signal to the controller, which is programmed to use the information to determine the degree of actuation of the brake pressure generator 60 to achieve a target brake force as requested by the driver's actuation of the brake pedal 28. In some constructions, an output of the pedal travel sensor 36 is also considered by the controller along with the primary pressure sensor 88 in quantifying the driver's braking request. The controller can also provide variable manipulation of the apply pressure control valves $72_1$, $72_2$ to achieve a desired brake force and brake force balance in the braking circuits. Thus, in the illustrated construction, the motor 64 is energized as programmed by the controller to drive the piston 62 forward in the cylinder toward the outlet 68 so that fluid pressure is generated at the outlet and hydraulic fluid is moved from the brake pressure generator 60 toward the wheel cylinders WC, which may include one or more pistons incorporated into brake calipers so that the hydraulic fluid from the generator 60 causes the wheel cylinders WC to squeeze onto a brake disc. As can be interpreted from this description, the brake pressure generator 60 is controlled to achieve an amount of braking according to the driver's request, which is interpreted at least in part by the primary pressure sensor 88, which continuously measures how hard the driver is applying pressure to the brake pedal 28. In the event of a component failure or abnormality, the braking system 20 is designed to provide a back-up mode of operation in which the isolation valves $52_1$, $52_2$ return to their normally-open positions to allow the brake pedal 28 to actuate the wheel cylinders WC through the master cylinder 24. However, the invention provides a diagnostic routine to check the operational status of the components in the simulator circuit, which enable the system 20 to maintain brake-by-wire operation.

During operation of the vehicle, at a diagnostic time when the braking system 20 is not being actuated to slow the vehicle, the controller is programmed to put the system into a diagnostic configuration as shown in FIG. 1 and carry out a diagnostic routine. For the diagnostic configuration, the controller is programmed to open (i.e., not actuate closed) the first isolation valve $52_1$ and the controller is programmed to actuate the first apply pressure control valve $72_1$ to open. The second isolation valve $52_2$ can be actuated closed, and the second apply pressure control valve $72_2$ can be left un-actuated to assume the normally-closed position. The open first isolation valve $52_1$ places the simulator circuit, in particular the simulator valve 84 and the pedal feel simulator 80, in fluid communication with the corresponding braking circuit, up to the corresponding inlet valves 44. As such, fluid communication is established between the simulator circuit and the pressure sensor 76 that is positioned in the braking circuit, in particular the pressure sensor 76 (differentiated from the primary pressure sensor 88 as being the "secondary" or "active circuit" pressure sensor) positioned between the brake pressure generator outlet 68 and the apply pressure control valves $72_1$, $72_2$. The simulator circuit is also fluidly coupled to the outlet 68 of the brake pressure generator 60. The inlet valves 44 coupled to the brake pressure generator 60 through the first apply pressure control valve $72_1$ are actuated closed by the controller as shown on the right side portion of FIG. 1 so that the associated wheel cylinders WC of the corresponding braking circuit are not exposed to a diagnostic pressurization. The normally-open valve 34 between the input side of the master cylinder 24 and the fluid reservoir 32 is also actuated closed by the controller for the diagnostic configuration.

Figure 2:
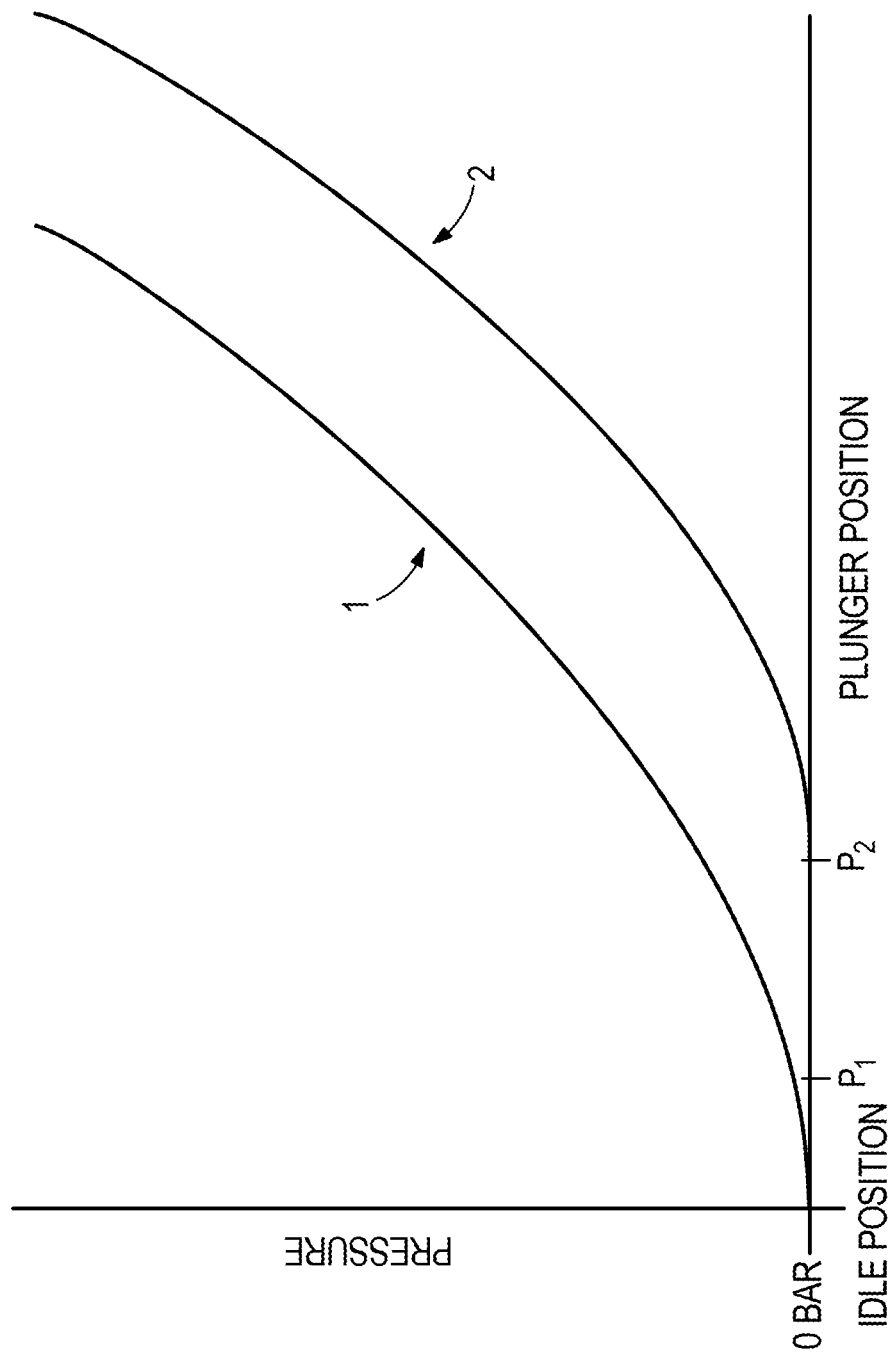
FIG. 2 is a graph of sensed pressure versus piston stroke, during a diagnostic routine.

During the diagnostic time, while no application of the brake pedal 28 is detected, the controller is programmed to maintain the simulator valve 84 and the first apply pressure control valve $72_1$ open, thus establishing a diagnostic circuit. With the system 20 put into the diagnostic configuration as described above and shown in FIG. 1, the controller can evaluate a relationship between displacement of the piston 62 and fluid pressure in the diagnostic circuit, including the simulator circuit. The controller is programmed to stoke the piston 64 in a forward, pressure-generating direction and then retract the piston 62 while the resulting fluid pressure is measured by the secondary pressure sensor 76 to observe a resulting brake fluid pressure decrease during piston retraction. The brake pressure generator 60 may be programmed to provide a predetermined actuation amount for the motor 64 to drive the piston 62, and once complete, the piston 62 can be retracted to idle position by reverse operation of the motor 64. The controller is particularly programmed to observe the relationship between piston retraction stroke and the resulting fluid pressure decrease to determine the piston position when the circuit pressure returns to a starting or at-rest value (i.e., 0 bar gauge pressure, above system nominal pressure such as atmospheric pressure). The information observed by the controller is represented by the graph of FIG. 2. The x-axis represents actuation amount, or position, of the piston 62, while the y-axis represents the sensed fluid pressure, in other words, the output of the secondary pressure sensor 76. FIG. 2 illustrates two exemplary plots or curves that may be observed by the controller during the diagnostic routine. When the results of the diagnostic routine finds that the pressure decreases along a first plot 1, on the left, during piston retraction, the pressure returns to 0 bar at a time when the piston 62 returns to the idle position, and this indicates a good check or satisfactory condition. If this is the case, the pressure will generally track along the first plot 1 of FIG. 2 both when increasing during piston actuation, or "forward movement" and when decreasing during piston retraction, or "backward movement".

In another circumstance, the results of the diagnostic routine may be that the controller identifies the pressure returning to 0 bar when the piston 62 is still in an advanced position and has not yet returned to the idle position. This is shown graphically by the second plot 2, on the right, of FIG. 2, separate from the first plot 1 and spaced in the positive direction along the x-axis from the first plot 1. If the pressure decreases during piston retraction along the second plot 2, the pressure reaches 0 bar before the piston 62 returns to the idle position. This indicates a bad check or unsatisfactory condition. In other words, the piston 62 position (e.g., $P_2$) at 0 bar exceeds a predetermined acceptable position (e.g., $P_1$) for a normally-functioning system, and the controller determines the occurrence of a mechanical failure in the simulator circuit. The failure can be a fluid leak or that the pedal feel simulator 80 has become stuck in an actuated position so that the pedal feel simulator 80 fails to return to an at-rest or ready position, and excess fluid remains trapped therein. The stuck-open pedal feel simulator 80 can be the result of a failure or misalignment in an internal component, such as a biasing member (e.g., spring) that biases a plunger or piston of the pedal feel simulator 80 back to the ready position.

The controller can be programmed to conduct the diagnostic routine in response to detecting an abnormal value from the primary pressure sensor 88, or the controller may be programmed to conduct the diagnostic routine upon each identification of a predetermined vehicle condition (e.g., acceleration), or the controller may be programmed to conduct the diagnostic routine on a less frequent basis, such as a single time during a period of continuous vehicle operation (e.g., first acceleration). Vehicle acceleration can be identified by the controller on the basis of a sensor output, such as a wheel speed sensor, an accelerometer, or a throttle position sensor, for example. The controller may be triggered to perform the diagnostic routine only when the vehicle is accelerating beyond a predetermined threshold or only when the throttle is open more than a predetermined threshold to avoid conditions in which the driver is likely to depress on the brake pedal 28 while the diagnosis is being performed.

The diagnostic routine serves as a hardware check that allows the controller to determine whether there is any mechanical failure of the simulator circuit (e.g., simulator valve 84 not opening, pedal feel simulator 80 stuck and not receiving fluid). In the case of a mechanical failure in the simulator circuit, the braking system 20 may not be enabled to perform brake-by-wire braking, since the simulator circuit is required to accept the fluid from the master cylinder 24 when the braking pressure comes from a source other than the master cylinder 24. However, when the controller can determine based on the diagnostic routine that there is nothing mechanically wrong with the simulator circuit, the system 20 can be operated in brake-by-wire operation. If the controller has determined that the primary pressure sensor 88 is reporting abnormal values and cannot be relied upon to generate the braking request signal for brake-by-wire operation, the braking system 20 transitions to a secondary brake-by-wire mode in which the braking request signal is generated by the pedal travel sensor 36, assuming that the diagnostic routine has indicated no physical failure in the simulator circuit. This method of operation enables the braking system 20 to perform in a more sophisticated manner and achieve better performance, by retaining brake-by-wire operation when the primary pressure sensor 88 fails, as long as the operability of the simulator circuit hardware is confirmed in the diagnostic routine.

Figure 3:
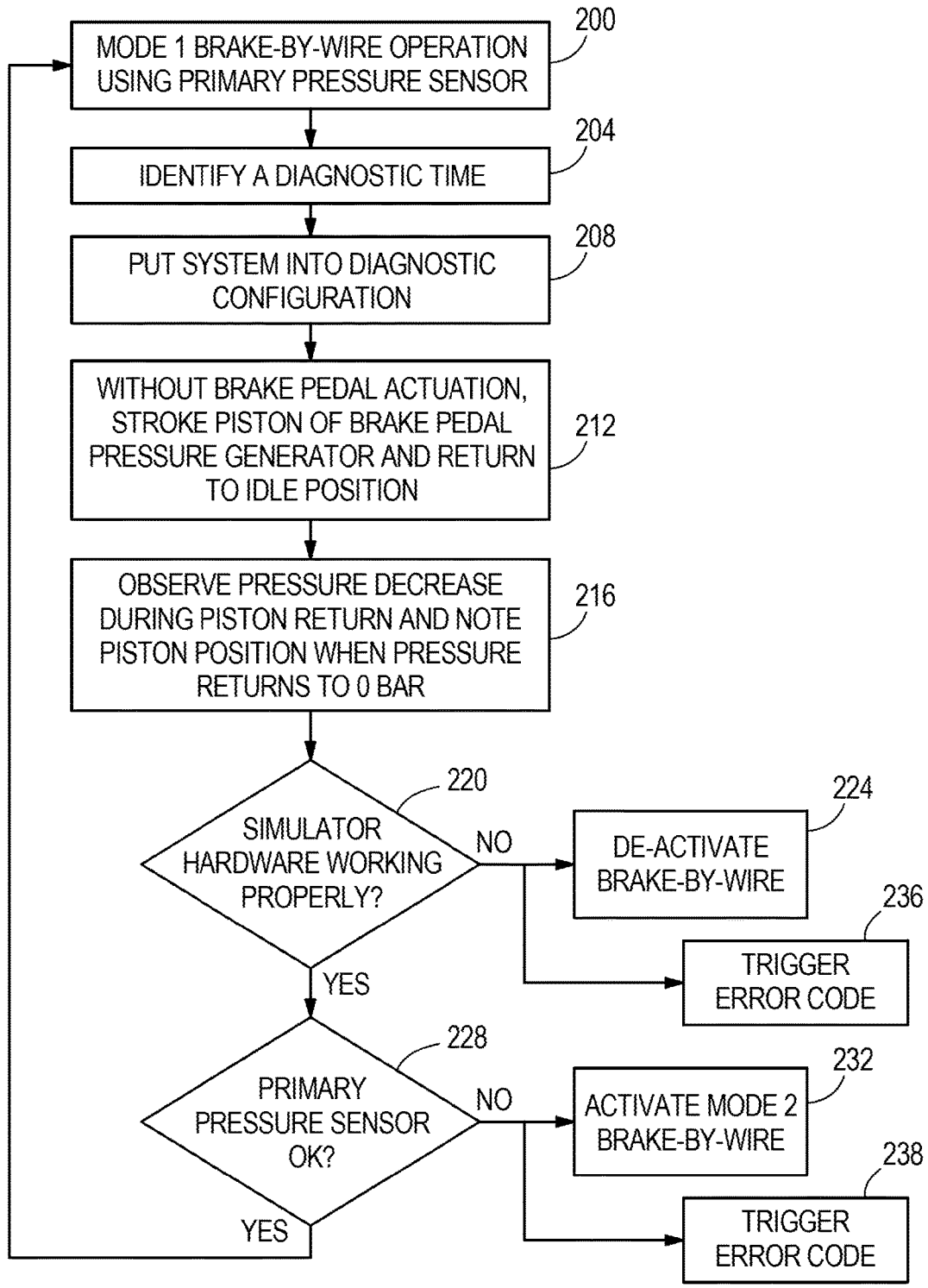
FIG. 3 is a flow diagram illustrating steps of a method according to one aspect of the invention.

The process carried out by the program of the controller as described above is visually represented in the flow diagram of FIG. 3. At step 200, the controller operates the braking system 20 in a first mode, which is the normal or primary brake-by-wire mode in which the braking force (i.e., hydraulic fluid pressure) to the wheel cylinders WC is produced by the brake pressure generator 60, not the master cylinder 24, in proportion to the driver's demand as manifested by the fluid pressure sensed by the primary pressure sensor 88. The apply pressure control valves 72$_1$, 72$_2$ may open and close as required to modulate the pressure to the two braking circuits. During step 200, the simulator valve 84 is open and the two isolation valves 52$_1$, 52$_2$ are closed. At step 204, the controller identifies the diagnostic time as described above. This may be part of a normal repetitive routine, or only triggered by the detection of an abnormality in the output of the primary pressure sensor 88. Examples of the manner in which the controller detects the abnormality have been described above. At step 208, the controller puts the braking system 20 into the diagnostic configuration. This includes controlling the system valves as shown in FIG. 1 to establish a diagnostic circuit (not for braking) that includes the brake pressure generator, the simulator circuit, and the secondary pressure sensor 76. In the diagnostic configuration, the simulator valve 84 is actuated to open. The braking system 20, in particular the program of the controller, then carries out the diagnostic routine to determine whether there is any fault with the mechanical components, such as those of the simulator circuit that normally enable fluid to be received from the master cylinder 24 during brake-by-wire operation.

At step 212, the controller (e.g., by control of the motor 64) drives the piston 62 to stoke or advance to push fluid toward the simulator circuit and subsequently drives the piston 62 to return to the idle position. At step 216, the controller is programmed to observe the resulting pressure decrease, as measured by the secondary pressure sensor 76, as the piston 62 returns toward the idle position. Thus, the controller can observe and note the position of the piston 62 when the fluid pressure returns to 0 bar and can compare this data to data or values stored in a memory of the controller to determine if the simulator hardware is in proper working condition at step 220. As described above, this can include determining whether the pedal feel simulator 80 is stuck open. When the simulator hardware is found to be in non-working condition, the pedal feel simulator 80 is prevented from returning fluid back to the master cylinder 24 upon release of the brake pedal 28 in the designed manner. As such, the controller de-activates brake-by-wire operation at step 224. For this mode of operation, the system valves default to their normally-biased positions. The braking system 20 is then operable in a "coupled" or "direct" braking mode in which fluid pressure at the master cylinder 24 is propagated to the wheel cylinders WC, and the brake pressure generator 60 is left idle. In addition to transitioning out of the primary brake-by-wire mode, the controller can also trigger and store an error code at step 236 when a malfunction of the simulator hardware is determined at step 220.

When the controller determines that the simulator hardware is working properly, the process continues to step 228 whereby the state of the primary pressure sensor 88 can optionally be confirmed. It is noted that the state of the primary pressure sensor 88 can be identified (e.g., identification of an abnormal value) in advance of the diagnostic time, and in some cases may trigger the diagnostic routine. If the simulator hardware is checked to be OK and the primary pressure sensor 88 has not reported abnormal values, the process returns to normal primary mode brake-by-wire operation at step 200. On the other hand, when the simulator hardware is checked to be OK and the primary pressure sensor 88 has reported abnormal values, the controller at step 232 is programmed to activate a secondary brake-by-wire mode. The controller can also trigger and store an error code at step 238 when the primary pressure sensor output is deemed abnormal. Rather than a generic "system fault" error, the error codes of steps 236 and 238 can include information identifying whether the simulator hardware, or the primary pressure sensor 88, was confirmed to be in working order or not. Thus, a service technician can more readily identify the source of the problem and more conveniently provide an appropriate repair or replacement. Optionally, the error code may be displayed to the driver in an instrument panel of the vehicle, either in a generic or specific format.

When the diagnostic routine proceeds to step 232 after confirming proper operation of the simulator hardware, the system 20 commences brake-by-wire operation in the secondary mode. In this mode, brake pedal actuation is detected by the pedal travel sensor 36, and the driver isolation valves 52$_1$, 52$_2$ are actuated to close and the simulator isolation valve 84 is actuated to open. As pedal feedback is provided by the pedal feel simulator 80, a braking request of the driver is sensed and reported to the controller by a sensor (e.g., the pedal travel sensor 36) other than the primary or secondary pressure sensors 88, 76. Brake force (i.e., hydraulic fluid pressure) corresponding to the braking request is generated by the brake pressure generator 60 and applied to the corresponding wheel cylinders WC through the respective apply pressure control valves 72$_1$, 72$_2$.

What is claimed is:

1. A vehicle comprising:
   a master cylinder having an input side configured to receive an input from a brake pedal and an output side configured to provide a master cylinder output, at least one braking circuit having at least one wheel cylinder and a brake pressure generator, including a strokable piston, separate from the brake pedal;
   a simulator circuit including a pedal feel simulator coupled to the master cylinder output side through a switchable simulator valve, the pedal feel simulator providing a reaction force to the brake pedal when the switchable simulator valve is in an open position;

at least one normally-open isolation valve operable to close and isolate the at least one braking circuit from the master cylinder and the simulator circuit;

a pressure sensor operable in at least one vehicle configuration to be in fluid communication with both the simulator circuit and the brake pressure generator; and a controller programmed to, at a designated diagnostic time when no input is received from the brake pedal, establish a diagnostic circuit connecting the simulator circuit with an outlet of the brake pressure generator, and to stroke the piston in an advancing, pressure-generating direction and then retract the piston while observing a resulting brake fluid pressure decrease with the pressure sensor during piston retraction, wherein the controller is further programmed to check whether the relationship between the observed brake fluid pressure decrease and the piston retraction is within a predetermined acceptable range for continued operation of a brake-by-wire vehicle braking mode in which the master cylinder is coupled to the simulator circuit and decoupled from the at least one braking circuit, while brake fluid pressure is generated solely by the brake pressure generator.

2. The vehicle of claim 1, wherein the controller is programmed to switch from brake-by-wire mode to a mechanical push-through back-up in which the master cylinder output side is coupled to the at least one braking circuit rather than the simulator circuit in response to the determination by the controller that the relationship between the observed brake fluid pressure decrease and the piston retraction is not within the predetermined acceptable range.

3. The vehicle braking system of claim 1, wherein the master cylinder is a tandem master cylinder and the master cylinder output side includes a first outlet from a first chamber pressurized by a first piston adjacent the brake pedal and further includes a second outlet from a second chamber pressurized by a second piston remote from the brake pedal, and wherein the at least one braking circuit includes first and second braking circuits respectively coupled to the first and second master cylinder outlets through respective first and second normally-open isolation valves.

4. The vehicle of claim 3, wherein the pressure sensor is positioned in the first braking circuit, coupled to the simulator circuit through the first normally-open isolation valve.

5. The vehicle of claim 1, further comprising a normally-open inlet valve providing selective fluid communication between the at least one wheel cylinder and a brake fluid supply line operable to receive brake fluid from the master cylinder output side and from the strokable piston of the brake pressure generator, and further comprising a normally-closed outlet valve providing selective fluid communication between the at least one wheel cylinder and a fluid reservoir of the master cylinder.

6. The vehicle of claim 5, wherein the controller is further programmed to close the normally-open inlet valve during the designated diagnostic time to prevent actuation of the at least one wheel cylinder by the brake pressure generator.

7. The vehicle of claim 1, wherein the controller is programmed to identify acceleration of the vehicle and to complete the stroking and retraction of the piston and observing the resulting decrease in brake fluid pressure during acceleration of the vehicle.

8. The vehicle of claim 1, wherein the at least one braking circuit further includes an apply pressure control valve in the form of a controller-modulated solenoid valve between an output of the brake pressure generator and the at least one wheel cylinder, and wherein the controller is programmed to hold the apply pressure control valve in an open position to establish fluid communication necessary to observe the relationship between the piston retraction and the resulting brake fluid pressure decrease using the pressure sensor.

9. The vehicle of claim 1, wherein the controller is programmed to store an error code identifying a stuck-open pedal feel simulator when the observed brake fluid pressure decreases outside the predetermined acceptable range.

10. The vehicle of claim 1, wherein the pressure sensor is separate from a primary pressure sensor used by the controller to generate a control signal for the brake pressure generator during a primary brake-by-wire mode of operation, and wherein controller is programmed to trigger the stroking and retracting of the piston and observing the resulting decrease in brake fluid pressure in response to identifying an abnormal value from the primary pressure sensor, and wherein the controller is programmed to transition to a secondary brake-by-wire mode using a pedal travel sensor to generate the control signal for the brake pressure generator when the relationship between the observed brake fluid pressure decrease and the piston retraction is within the predetermined acceptable range such that it is determined that the pedal feel simulator and the simulator valve are in working order and the cause of the abnormal value from the primary pressure sensor is a malfunction of the primary pressure sensor.

11. A method of operating a vehicle utilizing a controller, the method comprising:

operating in a primary brake-by-wire braking mode including:

receiving an input from a brake pedal at an input side of a master cylinder and providing a master cylinder output corresponding to the brake pedal input at an output side of the master cylinder output, closing, by a controller signal, at least one normally-open isolation valve to isolate the output side of the master cylinder from at least one braking circuit having at least one wheel cylinder, sending a controller signal to a switchable simulator valve to open a fluid connection between the master cylinder output side and a simulator circuit including a pedal feel simulator to provide a reaction force to the brake pedal, sending a braking request signal to the controller, the braking request signal corresponding to the input from the brake pedal, and driving a brake pressure generator of the at least one braking circuit with the controller responsive to the braking request signal to achieve braking at the at least one wheel cylinder, the brake pressure generator having a strokable piston separate from the brake pedal;

sending a controller signal, at a designated diagnostic time when no input is received from the brake pedal, to establish a diagnostic circuit connecting the simulator circuit with an outlet of the brake pressure generator;

at the designated diagnostic time when no input is received from the brake pedal, stroking the piston of the brake pressure generator in an advancing, pressure-generating direction and then retracting the piston while observing a resulting decrease in brake fluid pressure during piston retraction; and determining with the controller, whether the relationship between the observed brake fluid pressure decrease and the piston retraction is within a predetermined acceptable range for continued operation of the primary brake-by-wire braking mode.

12. The method of claim 11, wherein the controller determines whether the relationship between the observed fluid pressure decrease and the piston retraction is within the predetermined acceptable range by evaluating the piston position at which the brake fluid pressure reaches 0 bar.

13. The method of claim 11, wherein the brake pressure generator outputs brake pressure to a first braking circuit through a first control valve and outputs brake pressure to a second braking circuit through a second control valve.

14. The method of claim 13, wherein operating in the primary brake-by-wire braking mode further includes modulating an opening amount of each of the first and second control valves with the controller to set a first pressure provided to a first set of wheel cylinders of the first braking circuit and a second set of wheel cylinders of the second braking circuit.

15. The method of claim 11, wherein the brake pressure generator outputs brake pressure to the at least one braking circuit through a control valve, the method further comprising holding the control valve in an open position at the designated diagnostic time.

16. The method of claim 11, wherein, during the primary brake-by-wire braking mode, a primary pressure sensor detects fluid pressure at an outlet of the master cylinder coupled to a second chamber pressurized by a second piston remote from a first chamber having a first piston coupled to the brake pedal, and wherein the simulator circuit is coupled to an outlet of the master cylinder coupled to the first chamber.

17. The method of claim 16, wherein the decrease in brake fluid pressure during piston retraction is measured by a secondary pressure sensor that is isolated from the simulator circuit during the primary brake-by-wire braking mode.

18. The method of claim 11, wherein the designated diagnostic time is triggered when no input is received from the brake pedal and vehicle acceleration is identified.

19. The method of claim 11, further comprising automatically switching via the controller from the primary brake-by-wire mode to a secondary brake-by-wire mode that utilizes a brake pedal travel sensor as an input for the brake pressure generator in response to determining that the relationship between the observed brake fluid pressure decrease and the piston retraction is within the predetermined acceptable range such that it is confirmed that the pedal feel simulator and the simulator valve are in working order.

20. The method of claim 11, further comprising switching from the primary brake-by-wire mode to a mechanical push-through back-up mode that utilizes the brake pedal without using the brake pressure generator or the pedal feel simulator in response to determining that the relationship between the observed brake fluid pressure decrease and the piston retraction is outside the predetermined acceptable range.

* * * * *